United States Patent
Soma et al.

(10) Patent No.: US 8,120,295 B2
(45) Date of Patent: Feb. 21, 2012

(54) VEHICLE POWER CONTROLLER

(75) Inventors: Takaya Soma, Toyota (JP); Hiroshi Yoshida, Anjo (JP); Takeshi Mogari, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 595 days.

(21) Appl. No.: 12/227,976

(22) PCT Filed: Jun. 14, 2007

(86) PCT No.: PCT/JP2007/062473
§ 371 (c)(1),
(2), (4) Date: Dec. 4, 2008

(87) PCT Pub. No.: WO2008/004444
PCT Pub. Date: Jan. 10, 2008

(65) Prior Publication Data
US 2009/0167216 A1 Jul. 2, 2009

(30) Foreign Application Priority Data
Jul. 4, 2006 (JP) .................................. 2006-184446

(51) Int. Cl.
*H02P 3/14* (2006.01)
(52) U.S. Cl. ........................................ 318/376; 318/139
(58) Field of Classification Search .................. 318/376, 318/139; 180/65.29, 65.24; 320/109
See application file for complete search history.

(56) References Cited

U.S. PATENT DOCUMENTS

| 7,102,330 | B2 | 9/2006 | Ochiai et al. | |
|---|---|---|---|---|
| 2004/0227480 | A1 | 11/2004 | Kato et al. | |
| 2006/0244409 | A1* | 11/2006 | Takeuchi et al. | 318/811 |

FOREIGN PATENT DOCUMENTS

| JP | A-06-217406 | 8/1994 |
|---|---|---|
| JP | A-08-296537 | 11/1996 |
| JP | A-11-343890 | 12/1999 |
| JP | A-2000-354303 | 12/2000 |
| JP | A-2002-135903 | 5/2002 |
| JP | A-2003-143713 | 5/2003 |
| JP | A-2003-199203 | 7/2003 |
| JP | A-2004-142590 | 5/2004 |
| JP | A-2004-173424 | 6/2004 |
| JP | A-2004-350379 | 12/2004 |

OTHER PUBLICATIONS

Korean Office Action in Korean Patent Application No. 10-2009-7002238; dated Nov. 5, 2010 (with English-language translation).
Japanese Office Action in Japanese Application No. 2006-184446; dated Aug. 17, 2010 (with English-language translation).
Jul. 18, 2011 Korean Office Action issued in Korean Patent Application No. 10-2009-7002238 (with translation).

* cited by examiner

*Primary Examiner* — Karen Masih
(74) *Attorney, Agent, or Firm* — Oliff & Berridge, PLC

(57) ABSTRACT

A power controller alleviating change of braking feeling caused by reduced regenerative braking force is provided. Energy generated by regenerative braking is used for charging a capacitor. The charging power P(C) is calculated and whether P(C) has reached a maximum value WMAX of predetermined limit control value WIN(C) or not is determined. If P(C) is determined to have reached WMAX, WIN(C) is regulated to be smaller from that time point.

12 Claims, 3 Drawing Sheets

VEHICLE POWER CONTROLLER

TECHNICAL FIELD

The present invention relates to power control of a vehicle including a rotating electric machine that generates regenerative power at the time of braking and, more specifically, to power control of a vehicle including a capacitor charged with the regenerative power.

BACKGROUND ART

A vehicle mounting a power train referred to as a hybrid system, in which an engine (possibly a known mechanism such as a gasoline engine or a diesel engine) and a motor are combined, has been developed and commercially available. Further, a vehicle (electric vehicle, fuel cell electric vehicle) mounting a power train using only the motor as the running source and not mounting any engine, has also been developed. In such a vehicle, the motor functions as a generator at the time of braking of the vehicle to provide regenerative energy, and the regenerative energy charges an electric storage mechanism (a battery or a capacitor) for motor driving. Consequently, kinetic energy of the vehicle is recovered as electric energy, and regenerative braking force acts on the vehicle. In order to prevent any damage caused by excessive charging of electric storage mechanism, it is necessary to prevent generation of regenerative energy and to stop charging power to the electric storage mechanism, before the electric storage mechanism is fully charged. By such an operation, the regenerative braking force that has acted until then is lost, and the driver may feel something is wrong. Japanese Patent Laying-Open No. 11-343890 discloses a technique of preventing change of braking feeling, by allowing regenerative braking while the capacitor is in a fully charged state.

The controller disclosed in Japanese Patent Laying-Open No. 11-343890 is a purge controller of a canister in a hybrid vehicle including an engine generating driving force for running, a motor generating the driving force for running as well as regenerative braking force, and an electric storage mechanism supplying electric power for driving the motor and charged with the regenerative power generated by the motor. The controller includes a canister adsorbing evaporated fuel from the engine, a heater for heating the canister to purge evaporated fuel adsorbed by the canister, a remaining capacity detecting unit detecting the remaining capacity of the electric storage mechanism, and a purge control unit supplying regenerative power generated by the motor to the heater if the remaining capacity of the electric storage mechanism detected by the remaining capacity detecting unit is equal to or higher than a prescribed threshold value.

According to the controller disclosed in Japanese Patent Laying-Open No. 11-343890, when the remaining capacity of the electric storage mechanism detected by the remaining capacity detecting unit is smaller than the prescribed threshold value and charging of the electric storage mechanism is still possible, the electric storage mechanism is charged with the regenerative power generated by the motor through regenerative braking, and the kinetic energy of the vehicle body can be recovered as electric energy. If the remaining capacity is equal to or larger than the prescribed threshold value and further charging of the electric storage mechanism is impossible, the regenerative power generated by the motor through regenerative braking is supplied to the heater and can be used for purging evaporated fuel adsorbed in the canister. Therefore, regardless of the amount of remaining capacity of the electric storage mechanism, the motor can always execute regenerative braking. Accordingly, wasteful energy consumption can be prevented and the change of braking feeling can be avoided.

In the controller disclosed in Japanese Patent Laying-Open No. 11-343890, however, it is sometimes unnecessary to purge the evaporated fuel adsorbed in the canister, and actually, considering durability of the heater, frequency of supplying regenerative power to the heater is limited. Therefore, it is not always possible to avoid the change of braking feeling experienced when the regenerative braking force decreases.

DISCLOSURE OF THE INVENTION

The present invention was made to solve the above-described problem, and its object is to provide a power controller for a vehicle including a capacitor charged with regenerative power, which can alleviate change of braking feeling experienced when the regenerative braking force decreases, independent of any power consumption other than power consumption by capacitor charging.

The present invention provides a power controller that controls a vehicle including a rotating electric machine for running that generates electric power at the time of regenerative braking. The power controller includes a capacitor connected to the rotating electric machine and charged with energy of the generated electric power, and an operation unit connected to the capacitor. The operation unit calculates charging power to the capacitor, determines whether the charging power has reached a predetermined upper limit control value or not, and regulates the charging power to be smaller from the time point when the charging power has reached the upper limit control value.

According to the present invention, the energy generated at the time of regenerative braking (regenerative energy) is stored in the capacitor that has higher charge/discharge efficiency than a battery. Therefore, recovery efficiency of regenerative energy can be improved. In order to prevent instantaneous excessive current and excessive voltage to the capacitor, charging power to the capacitor is limited by a predetermined upper limit value. Further, in order to prevent any damage to the capacitor caused by excessive charging, it is necessary to prevent generation of regenerative energy and to stop charging power to the capacitor, before the capacitor is fully charged. If the charging power is cut from the time point when almost fully charged state has been reached, it would be necessary to abruptly reduce and cut the charging power, because chargeable remaining capacity of the capacitor is small. This might result in reduction of regenerative braking force after cutting the charging power, causing change of braking feeling. Therefore, the charging power to the capacitor is regulated to be smaller from the time point when the upper limit value has been reached. As compared with the cutting of charging power after the time point when almost fully charged state has been reached, chargeable remaining capacity of the capacitor is larger and, therefore, it is possible to moderately reduce and cut the charging power to the capacitor. Therefore, the regenerative braking force reduces moderately. As a result, for a vehicle including a capacitor charged with regenerative power, a power controller that can alleviate change of braking feeling experienced when the regenerative braking force decreases, independent of any power consumption other than that by capacitor charging, can be provided.

Preferably, the power controller further includes a detecting unit for detecting a voltage of the capacitor. The operation unit regulates the charging power to be made small in accordance with the voltage of the capacitor, in control of the charging power.

According to the present invention, the amount of charge (amount of electric storage) of the capacitor is generally in proportion to the square of capacitor voltage. It follows that when the capacitor voltage is higher, the capacitor is closer to the fully charged state. Therefore, the charging power to the capacitor is regulated to be smaller in accordance with the capacitor voltage. By way of example, if the capacitor voltage is high, the charging power to the capacitor is made smaller than when the capacitor voltage is lower. Thus, it becomes possible to decrease charging power to the capacitor in accordance with the state of charge of the capacitor. Consequently, it becomes possible to avoid any damage to the capacitor caused by excessive charging.

More preferably, the operation unit regulates the charging power to be made smaller when the voltage of the capacitor is high than when the voltage is low, in control of the charging power.

According to the present invention, the amount of charge (amount of electric storage) of the capacitor is generally in proportion to the square of capacitor voltage. It follows that when the capacitor voltage is higher, the capacitor is closer to the fully charged state. Therefore, if the capacitor voltage is high, the charging power to the capacitor is regulated to be smaller than when the capacitor voltage is lower. Consequently, it becomes possible to make smaller the charging power to the capacitor as the capacitor comes closer to the fully charged state.

More preferably, the power controller further includes a converter connected to the rotating electric machine in parallel with the capacitor, for converting and outputting voltage of energy of the generated electric power, and a secondary battery connected to the converter and charged with the converted energy.

According to the present invention, to the rotating electric machine, a secondary battery is connected through a converter, in parallel with the capacitor. Therefore, it is possible to charge the capacitor with the energy generated by the rotating electric machine and, in addition, it is possible to convert the voltage of energy generated by the rotating electric machine by the converter and to charge the secondary battery therewith.

More preferably, the operation unit switches between preferentially charging the secondary battery with the energy of generated electric power and preferentially charging the capacitor with the energy of generated electric power, by controlling the converter.

According to the present invention, by controlling the converter, the generated energy preferentially charges either one of the secondary battery and the capacitor. By way of example, if the output voltage of the converter is set to be equal to or lower than the capacitor voltage, the secondary battery comes to be charged with priority. If the output voltage of the converter is set higher than the capacitor voltage, the capacitor comes to be charged with priority. Thus, it becomes possible to preferentially charge either one of the secondary battery and the capacitor, in consideration of capacitor characteristic of higher charge/discharge efficiency than the secondary battery and the characteristic of secondary battery of larger storage capacity than the capacitor.

More preferably, the operation unit increases charging power to the secondary battery as charging power to the capacitor is made smaller, by controlling the converter.

According to the present invention, by way of example, by controlling the power converted by the converter, the charging power to the secondary battery is increased as the charging power to the capacitor is made smaller. Thus, more moderate reduction of regenerative braking force becomes possible.

BEST MODES FOR CARRYING OUT THE INVENTION

Figure 1:
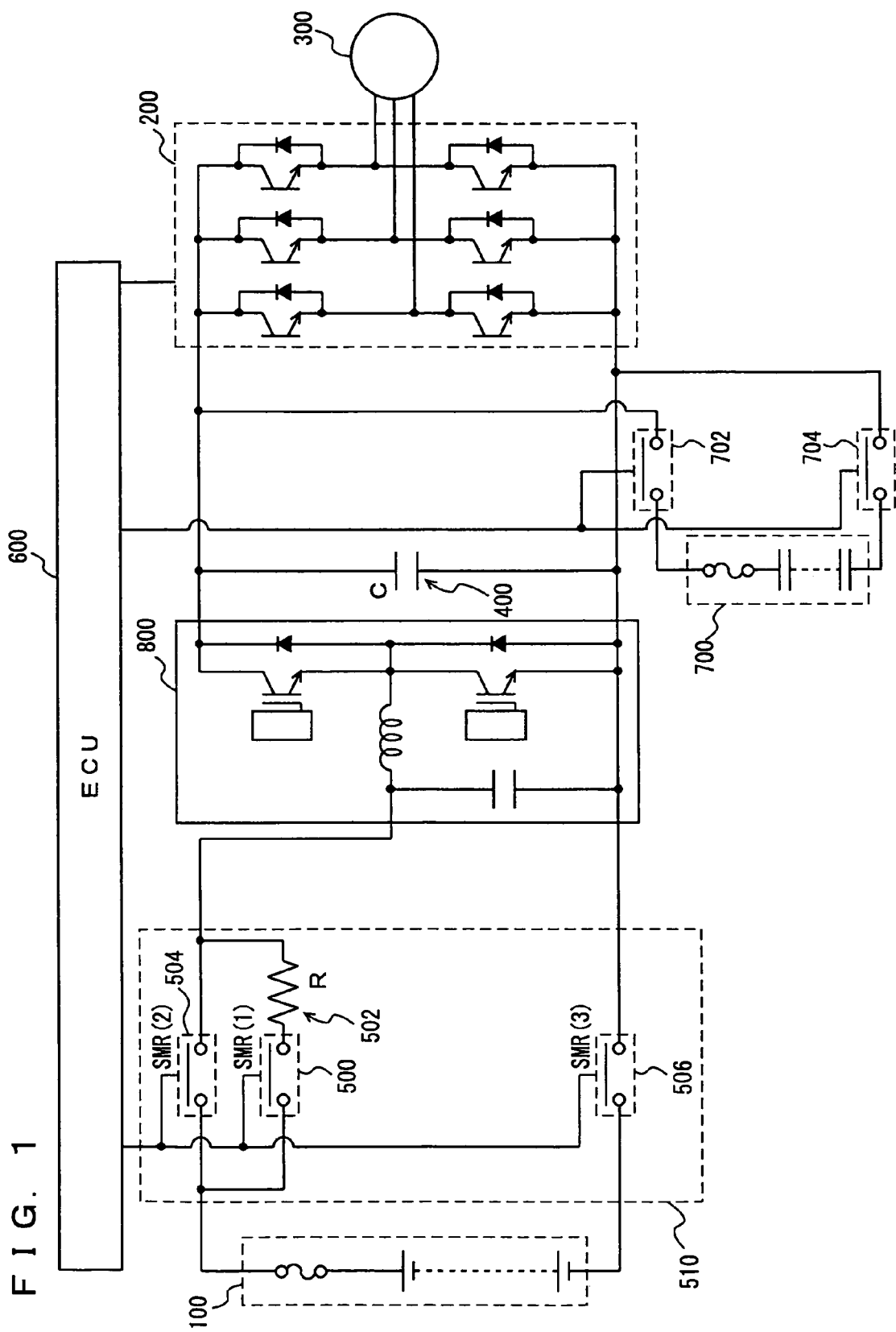
FIG. 1 shows a structure of a vehicle mounting the power controller in accordance with an embodiment of the present invention.

In the following, an embodiment of the present invention will be described with reference to the figures. In the following description, the same or corresponding portions are denoted by the same reference characters. Their names and functions are also the same. Therefore, detailed description thereof will not be repeated.

Referring to FIG. 1, the vehicle mounting the power controller in accordance with the embodiment of the present invention will be described. The vehicle includes: a battery 100; an inverter 200; a motor generator 300; a condenser 400; a system main relay 510 (SMR(1) 500, limiting resistor 502, SMR(2) 504, SMR(3) 506); and an ECU (Electronic Control Unit) 600. The power controller in accordance with the present embodiment is controlled by a program executed by ECU 600. In the present embodiment, the vehicle will be described as an electric vehicle that runs only by the driving force from motor generator 300. The vehicle on which power controller of the present invention is mountable is not limited to the electric vehicle, and it may be mounted on a hybrid vehicle, a fuel cell electric vehicle or the like.

Battery 100 is a battery assembly connecting in series a plurality of modules, each including a plurality of cells connected in series. In addition to battery 100, a capacitor 700 is provided and power is supplied from these to motor generator 300, in accordance with respective characteristics.

Inverter 200 includes six IGBTs (Insulated Gate Bipolar Transistors), and six diodes connected in parallel with the IGBTs respectively, to cause current flow from the emitter side to the collector side of the IGBT.

Based on a control signal from ECU 600, inverter 200 causes motor generator 300 to function as a motor or a generator. When motor generator 300 is caused to function as a motor, inverter 200 converts the DC power supplied from battery 100 or capacitor 700 to AC power, and supplies the converted power to motor generator 300. Inverter 200 regulates the power to be supplied to motor generator 300 by turning on/off (rendering conductive/non-conductive) the gate of each IGBT such that motor generator 300 attains to the output state required by the control signal from ECU 600.

When motor generator 300 is caused to function as a generator, inverter 200 converts the AC power generated by motor generator 300 to DC power, and charges battery 100 or capacitor 700 with this power. Inverter 200 regulates the power to be supplied to motor generator 300 by turning on/off (rendering conductive/non-conductive) the gate of each IGBT such that motor generator attains to the power generating state required by the control signal from ECU 600, and thereby controls charging power to battery 100 or capacitor 700.

Motor generator 300 is a three-phase AC motor and a generator generating electric power at the time of regenerative braking of the vehicle. Rotation shaft of motor generator 300 is eventually connected to a drive shaft (not shown). The vehicle runs receiving the driving force from motor generator 300.

Condenser 400 is connected in parallel with inverter 200. Condenser 400 temporarily stores electric charges, in order to smooth the electric power supplied from battery 100 or electric power supplied from inverter 200. The smoothed electric power is supplied to inverter 200 or battery 100.

System main relay 510 includes SMR (1) 500 and SMR (2) 504 on the positive electrode side, and SMR (3) 506 on the negative electrode side. SMR (1) 500, SMR (2) 504 and SMR (3) 506 are relays of which on-contact is closed when excitation current is caused to flow through the coil. SMR (1) 500 and SNR (2) 504 are provided on the positive electrode side of battery 100. SMR (1) 500 and SMR (2) 504 are connected in parallel. SMR (1) 500 has limiting resistor 502 connected in series thereto. SMR (1) 500 is a precharging SMR connected before SMR (2) 504 is connected, to prevent flow of rush current to inverter 200. SMR (2) 504 is a positive side SMR connected after SMR (1) 500 is connected and precharging is completed. SMR (3) 506 is a negative side SMR provided on the negative electrode side of battery 100. Each SMR is controlled by ECU 600.

When the power is connected, that is, when position of an ignition switch is switched from OFF through ACC and ON to STA, ECU 600 first turns on SMR (3) 506, and then turns on SMR (1) 500 to execute precharging. As the limiting resistor 502 is connected to SMR (1) 500, the voltage that acts on the inverter increases moderately even when SMR (1) 500 is turned on, and thus, generation of rush current can be prevented.

Further, as described above, the vehicle mounts capacitor 700 in addition to battery 100. Capacitor 700 is connected between the input side terminal of inverter 200 and condenser 400. Capacitor 700 has higher charge/discharge efficiency than battery 100 and, hence, it can respond to instantaneous high input/output. Capacitor 700 is charged/discharged with electric power from/to inverter 200, while ECU 600 controls opening/closing of relays 702 and 704 having on-contacts closed when excitation current is caused to flow to the coil.

A voltmeter detecting the capacitor voltage V and an ammeter detecting a capacitor current I are connected to capacitor 700. The voltmeter and ammeter are connected to ECU 600. Capacitor voltage value V and capacitor current value I are transmitted to ECU 600, so as to allow calculation of charging amount (amount of electric storage) of capacitor 700 and charging electric power value P(C) to the capacitor 700 by ECU 600. When we represent electrostatic capacitance of capacitor 700 by C, the charging amount of capacitor 700 is calculated as $C \times (V^2)/2$.

Further, the vehicle is provided with a boost converter 800, between battery 100 and inverter 200. Boost converter 800 boosts the rated voltage of about 200V of battery 100 to about 500V (rated voltage of motor). Boost converter 800 is formed of two IGBTs and a reactor that reduces current variation.

ECU 600 executes a program stored in an ROM (Read Only Memory) based on ignition switch (not shown), stepping amount of an accelerator pedal (not shown), stepping amount of a brake pedal (not shown) and the like. This program controls inverter 200, boost converter 800, SMRs and the like, whereby the vehicle is controlled to run in a desired state.

In the present embodiment, charging/discharging of battery 700 and capacitor 900 is controlled by changing the output voltage (system voltage) of boost converter 800.

By way of example, assume that electric power is to be supplied to motor generator 300. Here, if the output voltage of boost converter 800 is made lower than the capacitor voltage V, capacitor 700 is discharged with priority. If the output voltage of boost converter 800 is set equal to or higher than the voltage of capacitor 900, battery 100 is discharged with priority.

On the other hand, when the electric power generated by motor generator 300 at the time of regenerative braking is to be stored in battery 100 or capacitor 700 and if the output voltage of boost converter 800 is set equal to or lower than the capacitor voltage value V, battery 100 is charged with priority. If the output voltage of boost converter 800 is set higher than the capacitor voltage value V, capacitor 700 is charged with priority.

If an instantaneous high load is required, ECU 600 supplies electric power from capacitor 700 having higher charging/discharging efficiency than battery 100 through inverter 200 to motor generator 300. To be ready for such an occasion requiring instantaneous high load, it is necessary to always maintain capacitor 700 in an almost fully charged state. Therefore, in regenerative braking, ECU 600 sets on relays 702 and 704 and controls boost converter 800 so that capacitor 700 is charged with priority.

In the present embodiment, ECU 600 controls inverter 200 such that the power generation value (regenerative power value) of motor generator 300 does not exceed the sum of limit charging power WIN (C) to capacitor 700 and limit charging power WIN(B) to battery 100. Further, ECU 600 controls converter 800 such that the generated electric power from motor generator 300 is distributed to capacitor 700 and battery 100 with the charging power P(C) to the capacitor 700 and charging power P(B) to battery 100 not exceeding respective limit values. This prevents excessive current and excessive voltage to capacitor 700 and battery 100.

Further, in order to prevent damage to capacitor 700 caused by excessive charging, ECU 600 reduces the charging power P(C) to approximately zero, by making smaller the limit charging power WIN(C), before capacitor 700 reaches fully charged state.

ECU 600 controls inverter 200 and converter 800 such that as the limit charging power WIN(C) becomes smaller, the limit charging power WIN(B) increases.

Figure 2:
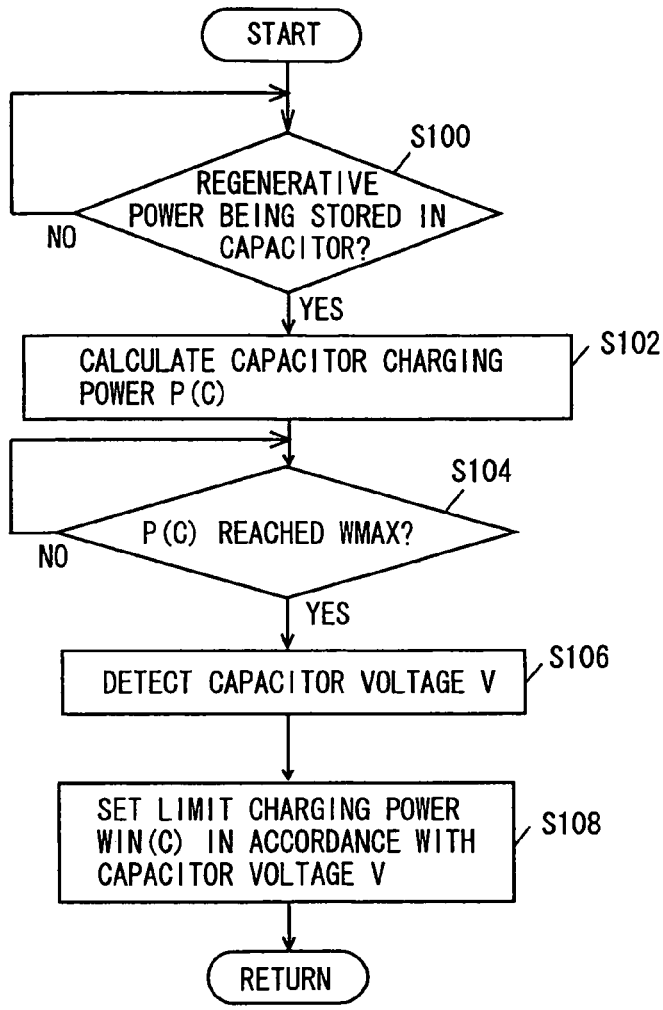
FIG. 2 is a flowchart representing a control structure of an ECU implementing the power controller in accordance with the embodiment of the present invention.

Referring to FIG. 2, control structure of the program executed by ECU 600 forming the power controller in accordance with the present embodiment will be described.

At step (hereinafter "step" will be denoted as "S") 100, ECU 600 determines whether capacitor 700 is being charged with regenerative energy or not. By way of example, ECU calculates degree of increase of capacitor voltage value V and if the degree of increase is larger than a threshold value, it determines that the capacitor is being charged. The method of determining whether capacitor 700 is being charged with regenerative energy or not is not limited to this. If it is being charged (YES at S100), the process proceeds to S102. If not (NO at S100), the process returns to S100.

At S102, ECU 600 calculates charging power P(C) of capacitor 700. By way of example, ECU 600 calculates a product of capacitor voltage value V and capacitor current value I as charging power P(C).

At S104, ECU 600 determines whether charging power P(C) has reached the maximum value WMAX of limit charging power WIN(C) or not. When it has reached WMAX (YES at S104), the process proceeds to S106. If not (NO at S104), the process returns to S104.

Figure 3:
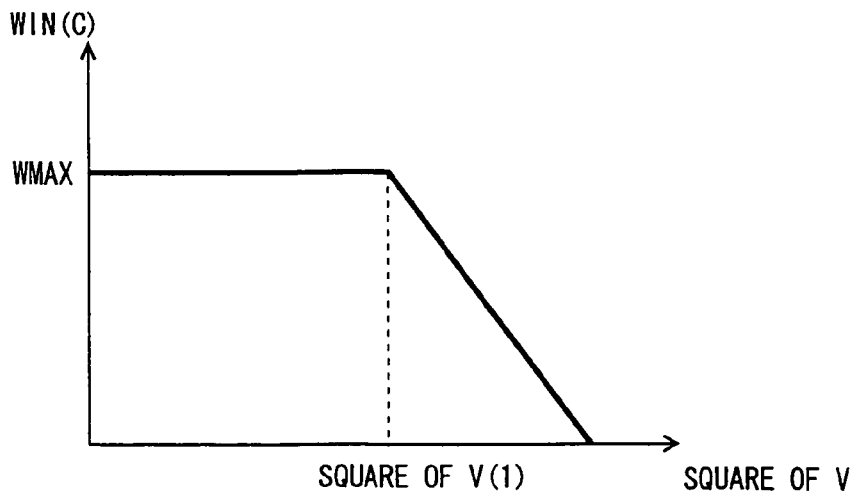
FIG. 3 shows a relation between a limit value of charging power and the voltage value of a capacitor provided on the vehicle mounting the power controller in accordance with the embodiment of the present invention.

At S106, ECU 600 detects the capacitor voltage value V. At S108, ECU 600 makes smaller the limit charging power WIN (C) in accordance with capacitor voltage value V. For instance, ECU 600 sets smaller the limit charging power WIN(C) in proportion to the square of capacitor voltage value V, when the charging power P(C) reaches WMAX with capacitor voltage V(1), as shown in FIG. 3.

An operation of vehicle mounting the power controller according to the present embodiment based on the above-described configuration and flowchart will be described.

Figure 4:
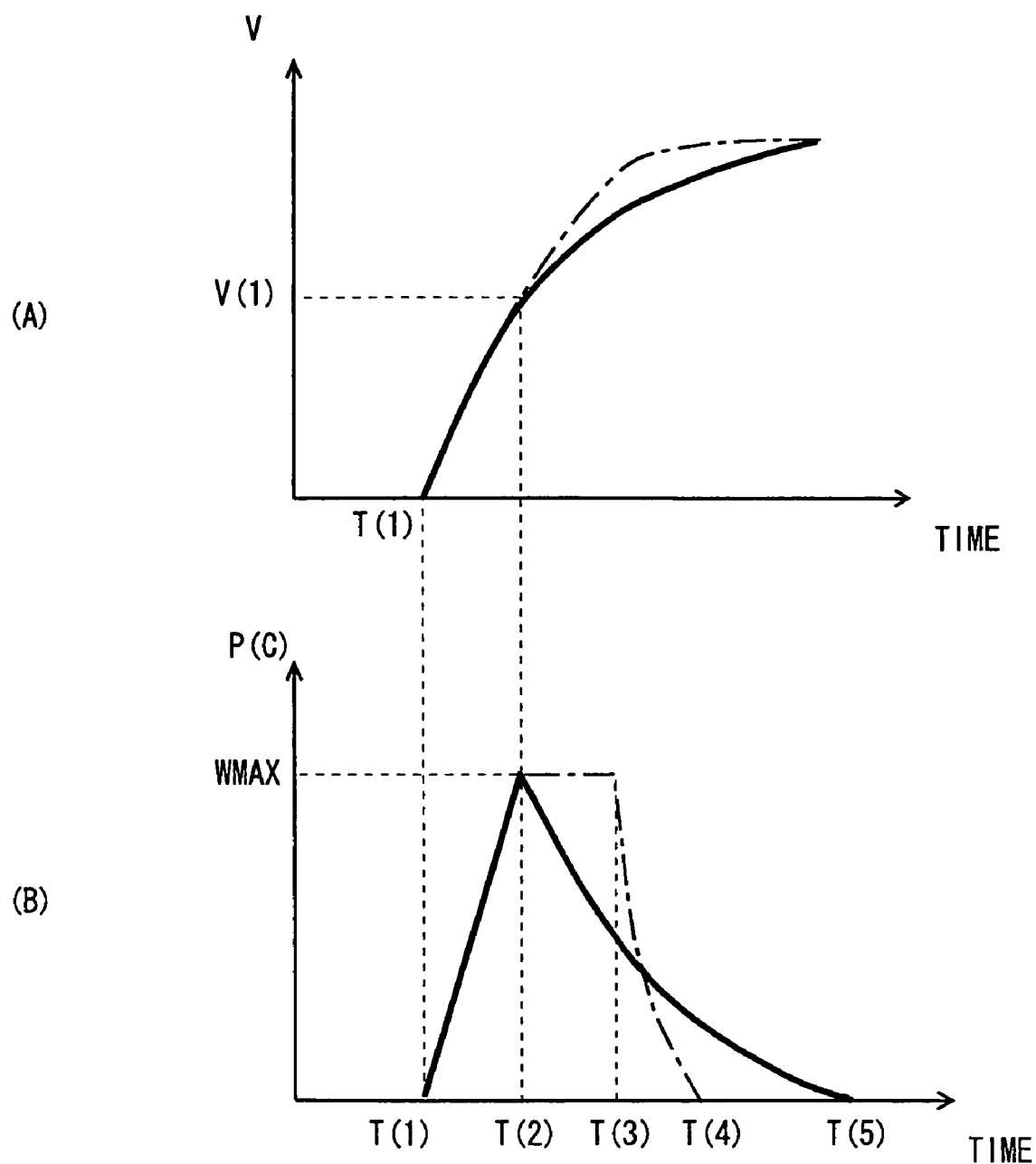
FIG. 4 is a timing chart of the charging power and the voltage value of a capacitor provided on the vehicle mounting the power controller in accordance with the embodiment of the present invention.

When motor generator 300 generates regenerative energy by regenerative braking of the vehicle and charging of capacitor 700 with the regenerative energy starts at time T(1) as shown in FIG. 4 (S100), the charging power P(C) of capacitor 700 is calculated (S102) based on the capacitor voltage value V and capacitor current value I. Here, the operation is controlled by ECU 600 such that capacitor 700 is charged with priority with the regenerative energy. The charging power P(C) increases gradually and at time T(2), it reaches the maximum value WMAX of limit charging power WIN(C) (YES at S104).

In order to prevent damage to capacitor 700 caused by excessive charging, it is necessary to prevent generation of regenerative power and to cut charging power P(C), before capacitor 700 is fully charged. In order to cut charging power P(C), if the charging power P(C) is reduced from time point T(3) at which capacitor 700 is in an almost fully charged state, it would be necessary to reduce the power rapidly to time point T(4), as the chargeable remaining capacity of capacitor 700 is small, as shown by the chain-dotted line of FIG. 4(B).

In order to reduce charging power P(C), the limit charging power WIN(C) of capacitor 700 is made smaller. As the limit charging power WIN(C) is made smaller, the limit charging power WIN(B) to battery 100 is made larger. Therefore, charging power P(B) to battery 100 increases. This allows more moderate reduction of regenerative braking force. It is noted, however, that as compared with the rate of reduction of charging power P(C) to capacitor 700, the rate of increase of charging power P(B) to battery 100 lags behind, because of the reason that charging of battery 100 involves chemical reaction. Because of this lag, the regenerative braking force would drop instantaneously, and the driver may possibly feel something odd.

Therefore, at the time point when charging power P(C) reaches WMAX with capacitor voltage value V(1) (YES at S104), the limit charging power WIN(C) is set to be smaller in proportion to the square of capacitor voltage value V (S108).

Consequently, capacitor voltage value V increases more moderately (see solid line of FIG. 4(A)) than when the charging power P(C) is kept WMAX (chain-dotted line in FIG. 4(A)). The limit charging power WIN(C) is set to be smaller in proportion to the square of this capacitor voltage value V that increases moderately. Therefore, the charging power P(C) becomes smaller as capacitor 700 comes closer to the fully charged state, and damage to capacitor 700 caused by excessive charging can be prevented. Further, as represented by the solid line of FIG. 4(B), from the time point T(2) at which sufficient chargeable capacity of capacitor 700 is ensured to the time point T(5) of almost fully charged state, charging power P(C) can be reduced moderately. Therefore, the rate of increase of charging power P(B) to battery 100 follows the rate of reduction of charging power P(C) with smaller lag. Thus, instantaneous reduction in regenerative braking force can be reduced.

As described above, in the ECU forming the power controller in accordance with the present embodiment, from the time point when the capacitor charging power reaches the maximum limit value, the limit value of the charging power is regulated to be smaller. Therefore, as compared with the approach in which the charging power is maintained at the maximum limit value, the charging power can be made smaller from the time point at which sufficient chargeable capacity of the capacitor is ensured. As a result, the charging power to the capacitor can be reduced and cut more moderately, and abrupt change of braking feeling can be avoided.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A power controller for a vehicle including a rotating electric machine for running that generates electric power at a time of regenerative braking, said controller comprising:
   a capacitor connected to said rotating electric machine and charged with energy of said generated electric power; and
   a control unit connected to said capacitor, wherein said control unit
      calculates charging power to said capacitor,
      determines whether said charging power has reached a predetermined limit charging power to said capacitor or not, and
      regulates said limit charging power to said capacitor to be smaller when said charging power has reached said limit charging power to said capacitor.

2. The power controller according to claim 1, further comprising:
   a detecting unit detecting a voltage of said capacitor, wherein
      said control unit regulates said limit charging power to said capacitor to be made small in accordance with the voltage of said capacitor to control said charging power.

3. The power controller according to claim 2, wherein said control unit regulates said limit charging power to said capacitor to be made smaller when the voltage of said capacitor is high than when the voltage is low to control said charging power.

4. The power controller according to claim 1, further comprising:
   a converter connected to said rotating electric machine in parallel with said capacitor, for converting and outputting a voltage of an energy of said generated electric power; and
   a secondary battery connected to said converter and charged with said energy of generated electric power.

5. The power controller according to claim 4, wherein said control unit switches between preferentially charging said secondary battery with said energy of generated electric power and preferentially charging said capacitor with said energy of generated electric power, by controlling said converter.

6. The power controller according to claim 4, wherein said control unit increases a limit charging power to said secondary battery as said limit charging power to said capacitor is made smaller, by controlling said converter.

7. A power controller for a vehicle including a rotating electric machine for running that generates electric power at a time of regenerative braking, said controller comprising:
    a capacitor connected to said rotating electric machine and charged with energy of said generated electric power;
    means for calculating charging power to said capacitor;
    means for determining whether said charging power has reached a predetermined limit charging power to said capacitor or not; and
    control means for regulating said limit charging power to said capacitor to be smaller when said charging power has reached said limit charging power to said capacitor.

8. The power controller according to claim 7, further comprising:
    means for detecting a voltage of said capacitor, wherein said control means includes means for regulating said limit charging power to said capacitor to be made small in accordance with the voltage of said capacitor.

9. The power controller according to claim 8, wherein said control means includes means for regulating said limit charging power to said capacitor to be made smaller when the voltage of said capacitor is high than when the voltage is low.

10. The power controller according to claim 7, further comprising
    a converter connected to said rotating electric machine in parallel with said capacitor, for converting and outputting a voltage of an energy of said generated electric power; and
    a secondary battery connected to said converter and charged with said energy of generated electric power.

11. The power controller according to claim 10, further comprising
    means for switching between preferentially charging said secondary battery with said energy of generated electric power and preferentially charging said capacitor with said energy of generated electric power, by controlling said converter.

12. The power controller according to claim 10, comprising:
    means for increasing a limit charging power to said secondary battery as limit charging power to said capacitor is made smaller, by controlling said converter.

\* \* \* \* \*